June 20, 1961 C. C. COHN 2,989,444
SLIDE FASTENER ASSEMBLY
Filed Sept. 30, 1957 4 Sheets-Sheet 1

INVENTOR.
CHARLES C. COHN
BY
ATTORNEYS

June 20, 1961 C. C. COHN 2,989,444
SLIDE FASTENER ASSEMBLY
Filed Sept. 30, 1957 4 Sheets-Sheet 2

INVENTOR.
CHARLES C. COHN
BY
ATTORNEYS

INVENTOR.
CHARLES C. COHN
BY
ATTORNEYS

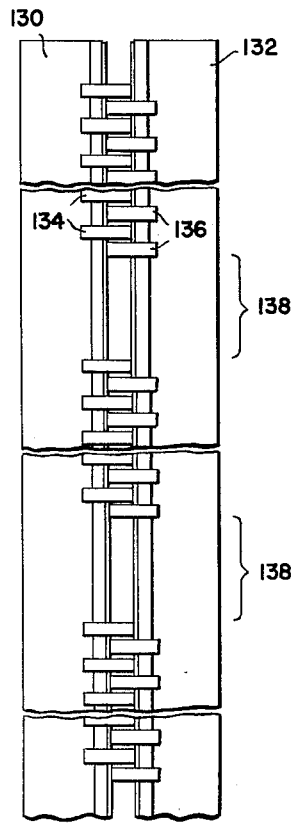
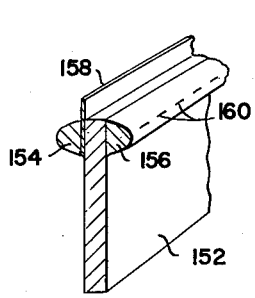
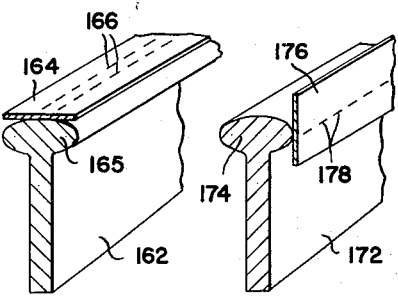
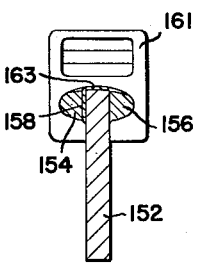
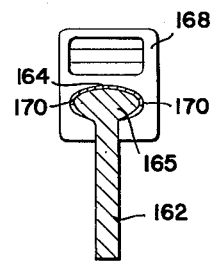
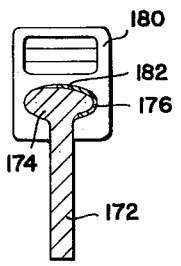
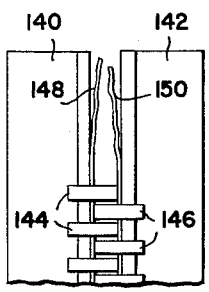
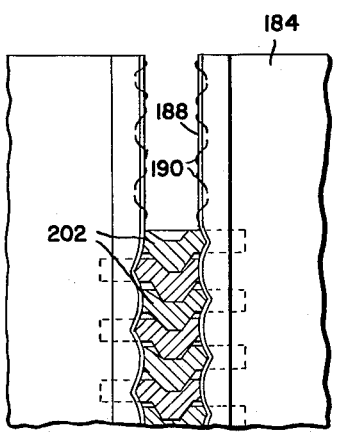
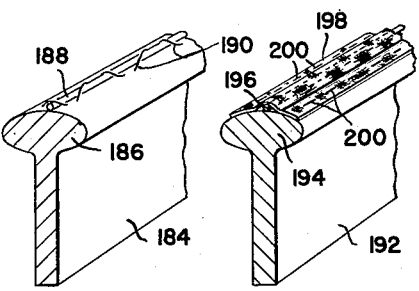

United States Patent Office 2,989,444
Patented June 20, 1961

2,989,444
SLIDE FASTENER ASSEMBLY
Charles C. Cohn, Atlantic City, N.J., assignor to Samuel L. Cohn and Charles C. Cohn, copartners trading as Colonial Alloys Company, Philadelphia, Pa.
Filed Sept. 30, 1957, Ser. No. 686,967
4 Claims. (Cl. 204—23)

This invention relates to slide fasteners of the zipper type, and more particularly to the manufacture of slide fasteners, the treatment of slide fasteners and apparatus involved in the manufacture and treatment of slide fasteners. This application is a continuation-in-part of my copending application Serial No. 639,871, filed February 13, 1957, now abandoned.

It is customary in the manufacture of slide fasteners to attach metallic elements to a suitable tape or web and thereafter to treat the individual elements. Such treatments conventionally involve cleaning and coating of the elements, and dyeing and sealing of the coated elements. Cleaning, dyeing and sealing treatments do not necessarily involve electro-chemical operations but coating treatments and some dyeing and sealing treatments involve electro-chemical operations. All of these treatments are, however, accomplished in solutions and the impregnation of a fastener tape with a treatment solution gives rise to the undesirable removal of treatment solution from the treating bath and also gives rise to undesirable aftereffects on subsequent treatment solutions, on the tape itself and on the fastener elements as a result of the solutions contained by the tape coming into contact with the fastener elements.

In order to avoid impregnation of the fastener tape by the treatment solutions it is contemplated, in accordance with this invention, to waterproof the fastener tape prior to the attachment thereto of the fastener elements in order that the various solutions involved in the subsequent treatment of the fastener elements will not impregnate the tape. The invention further contemplates the employment of removable waterproofing of the tape in order that subsequent tape treatment may be accomplished after the treatment of the elements has been completed or, alternatively, in some cases, it is desirable to accomplish final dyeing of the elements and the tape simultaneously, it being desirable, however, not to carry into the dyeing solutions those solutions theretofore employed in treatment of the elements.

A further object of the invention is to accomplish sealing of the dyed elements at temperatures which will not adversely affect or remove the removable waterproofing materials commonly employed such as, for example, waterproofing waxes and oils.

It is a further object of the invention to provide apparatus for manufacturing a fastener assembly providing, at the time of manufacture of the assembly, a conductor extending between and in contact with each of the fastener elements in such a manner as to not adversely affect the desired flexibility of the fastener and, at the same time, to insure uniform electrical contact between the fastener elements and a source of electric power.

When slide fasteners are manufactured they are manufactured as extended lengths of tapes with fastener elements attached thereto in spaced groupings. The spacings between the groupings provide areas in which the tapes may be severed to provide individual fastener assemblies of useable lengths. If the conductors extending between the fastener elements and the tapes are secured to the tapes only by the elements, the conductors in the regions between groups of elements will present objectionable loose ends which will require special handling when the top and bottom stops are applied to the tapes and when the fastener assembly is ultimately sewn into a garment or other article.

It is, therefore, a further object of the invention to provide a fastener assembly in which a conductor is positioned in engagement with each of the fastener elements on each tape and in which each conductor is secured to its associated fastener tape in regions thereof not mounting fastener elements.

It is a further object of the invention to provide novel electro-chemical treating apparatus for a fastener assembly having an electrical conductor extending between and in contact with the fastener elements.

These and other objects of the invention relating to the manufacture of a slide fastener and relating to the treatment thereof will be hereinafter described in conjunction with the accompanying drawings in which:

FIGURE 6 is a showing of an extended length of assembled fastener tapes;

FIGURE 7 is a fragmentary showing of an assembled fastener tape showing the end portion thereof having undesirable loose ends of conductive elements;

FIGURE 8 is a fragmentary perspective showing of one form of tape manufactured in accordance with the invention;

FIGURE 9 is a transverse section through the tape shown in FIGURE 8 having a fastener element attached thereto;

FIGURE 10 is a fragmentary perspective showing of an alternative form of a tape manufactured in accordance with the invention;

FIGURE 11 is a transverse section through the tape shown in FIGURE 10 having a fastener element attached thereto;

FIGURE 12 is a fragmentary perspective showing of an alternative form of a tape manufactured in accordance with the invention;

FIGURE 13 is a transverse section through the tape shown in FIGURE 12 having a fastener element attached thereto;

FIGURE 14 is a fragmentary perspective showing of an alternative form of a tape manufactured in accordance with the invention;

FIGURE 15 is a fragmentary perspective showing of an alternative form of a tape manufactured in accordance with the invention; and FIGURE 16 is a fragmentary showing partly in section of assembled fastener tapes of the type shown in FIGURE 14 having a fastener element attached thereto.

Figure 1:
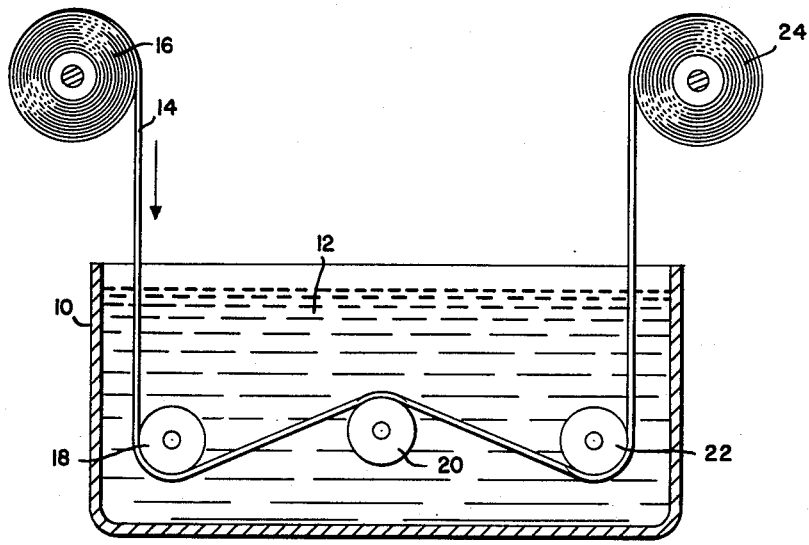
FIGURE 1 is a sectional diagram showing a bath for the treatment of slide fastener tapes.

According to my invention I treat slide fastener tapes before the fastener elements are secured thereto with a waterproofing solution. Apparatus for accomplishing this is shown in FIGURE 1 and involves a suitable tank 10 containing a solution 12 which will be hereinafter described. A slide fastener tape 14 passing from a supply roll 16 thereof enters the solution and is drawn over a succession of rollers 18, 20 and 22, emerging from the tank and being wound upon a receiving reel 24. Numerous types of impregnating apparatus are well known in the art and may be employed to impregnate the slide fastener tape.

The waterproofing solution 12 is one which impregnates the tape with a waterproofing material which is not only removable but also one which is not adversely affected by temperatures of the order of 120° F. which are involved in certain fastener element treatments as will hereinafter be described. Such a solution may be composed essentially of one of the commonly known wax and solvent solutions such as, for example, carnauba wax or Japan wax in a solution of toluol, carbon tetrachloride or a petroleum solvent. Carnauba wax has a melting point of 185° F. and Japan wax has a melting point of 138° F. In place of the waxes noted above, various oils and solvent mixtures known to the art may be employed to provide removable waterproofing which will not be adversely affected by temperatures of the order of 120° F.

In addition to the application of removable waterproofing by means of a bath comprising a solution of a waterproofing wax or oil and a solvent, direct application of melted waxes or heated oils may be applied to the tapes in order to provide only a partial impregnation or a surface coating of a waterproofing material. These processes are well known in the art and may be employed with waxes such as those noted above having melting temperatures substantially above 120° F.

When the subsequent removal of the waterproofing from the tapes is not desired, various other well known waterproofing materials may be employed such as, for example, various insoluble soaps such as oleates, and various resin dispersions. These materials are resistant to temperatures above 120° F.

Tapes thus treated will have the advantage of not absorbing the solutions in which the assembled slide fastener elements are treated and, by waterproofing the tape before the slide fastener elements are attached thereto, coating of the elements by the waterproofing material is avoided and thus the waterproofing process has no adverse effect on the subsequent treatment of the fastener elements.

Figure 2:
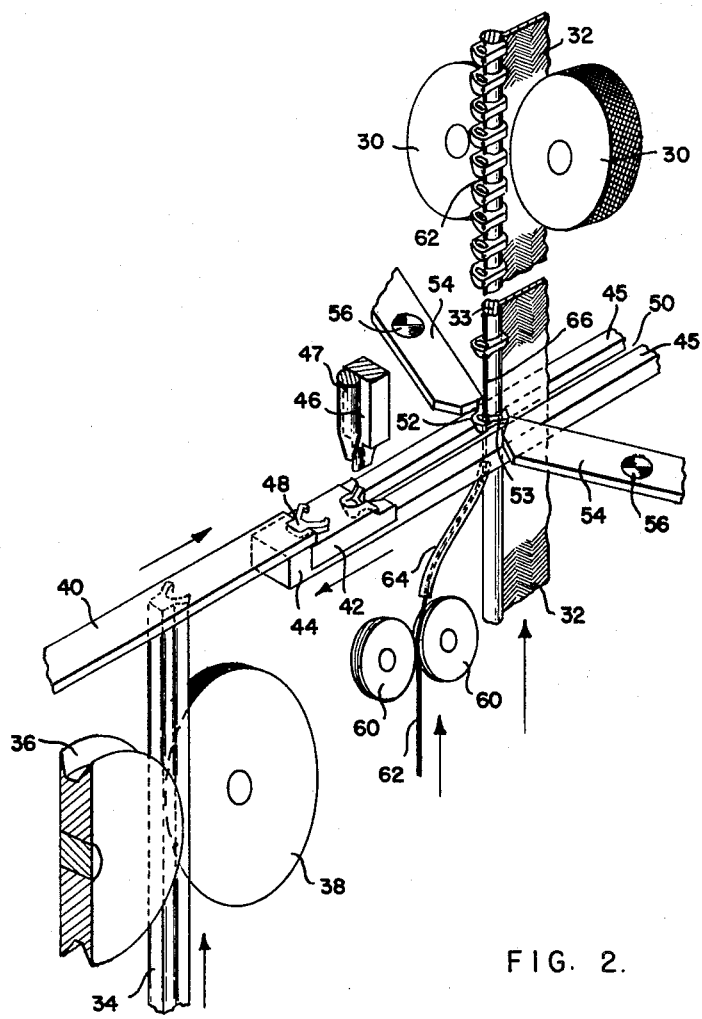
FIGURE 2 is a diagrammatic showing of apparatus for assembling slide fastener elements to a tape with a conductor positioned between the elements and the tape and in contact with the elements.

Slide fastener tapes waterproofed in accordance with the foregoing are then assembled with fastener elements in apparatus shown in FIGURE 2. In FIGURE 2 there is shown a pair of rollers 30 which serve to advance a treated tape 32 upwardly as shown in the drawing. A preformed metal wire 34 is fed upwardly through the machine by means of a pair of mating rollers 36 and 38. The wire shown in the drawing is generally Y-shaped cross section suitable for forming the fastener elements. The wire is fed upwardly and a cutting slide 40 cuts successive sections from the end of the wire thick enough to form a fastener element blank and transfers a successive element blank horizontally to a position indicated at 48 over a forming die 42 mounted in a transfer slide 44. A forming punch 46—47 moves each fastener member blank 48 from the cutting slide 40 to the forming die 42 and, during a subsequent movement of the transfer slide 44, cooperates with the die to finally form the fastener element blank. The transfer slide 44 is formed with legs 45 providing a centrally located elongated slot 50 through which the fastener tape 32 is drawn upwardly by the rollers 30. The movement of the transfer slide carries the fastener to the position of the element 52 with the legs 53 of the element positioned on opposite sides of the beaded edge 33 of the fastener tape 32. At the same time, the transfer slide strikes the ends of the clamping levers 54 causing them to rotate around their pivots 56, thus bringing the adjacent ends of the levers 54 against the legs 53 of the fastener member squeezing them into position on the bead 33 of the tape.

The apparatus thus far described is identical to that disclosed in greater detail in the patent to Sundback, No. 2,141,200, dated December 27, 1938.

In the present apparatus there is additionally provided a pair of feed rollers 60 feeding a wire 62 upwardly through a wire guide 64 to a position adjacent to the bead 33 of the tape 32. The uppermost end of the wire guide 64 serves to position the wire 62 adjacent to the bead 33 immediately below the fastener elements 52 being attached to the tape bead and thus, as the elements are applied to the bead, the wire 62 is drawn against the bead and is clamped between the bead and the elements in conductive contact with the successive elements.

Numerous types of fabric tapes are conventionally employed in slide fastener construction, these and various bead structures may be employed in the carrying out of the invention disclosed herein. The fastener elements are generally formed from a metal such as aluminum, aluminum alloys, copper, brass or zinc. When aluminum or aluminum alloy fastener elements are employed, the subsequent electro-chemical treatments usually involve anodizing and coloring, or sometimes, plating. When copper, brass or zinc fastener elements are employed, the subsequent electro-chemical treatments usually involve the electro-plating operations. Hereinafter, these two classes of elements will be referred to broadly as aluminum and copper. When aluminum fastener elements are involved, the conductive wire is preferably aluminum or possibly titanium; when copper fastener elements are employed, the conducting wire is preferably copper or brass.

While the wire shown is a single strand of wire, the wire may also be a woven, braided or other multi-strand conductor. However, due to the relatively small dimension of the conductor required the conductor will generally be a single solid wire.

The apparatus shown in FIGURE 2 provides for the selective introduction of the conductive wire into fastener assemblies in the process of assembly without retarding the rate of production and without materially increasing the cost of production of the fastener assembly. It should be noted that the wire 62 is positioned on the face of the bead on the plane of the tape. Flexing of the fastener assembly occurs primarily transversely of the plane of the tape and not in the plane of the tape and thus the addition of the wire in this position provides no substantial stiffening of the fastener assembly. It will be evident that while the apparatus shown is of a type which employs a formed wire 34 from which elements are cut and reshaped by means of the punch and die set 46—47 and 42, the invention may be employed with other types of fastener assembling apparatus involving, for example, the cutting of blanks from an unformed wire and completely forming the cut blank prior to attachment thereto to a web and other assembling processes.

Numerous types of continuous and batch treatment apparatus have been heretofore disclosed for insuring uniform treatment of fastener elements in an electrolytic bath in which a tape mounting the elements is immersed. Batch and continuous treatment apparatus are shown in my Patents Nos. 2,572,383 and 2,715,095, respectively. In each of these two patents and in other commonly employed arrangements the major problem involved is the provision of uniform current flow to each of the fastener elements. When the fastener assembly includes a conductive wire such as is involved in a fastener assembled by means of the apparatus shown in FIGURE 2, this problem of conduction of the treating current is eliminated and treatment may be accomplished by means of relatively simple apparatus such as is shown in FIGURE 3.

Figure 3:
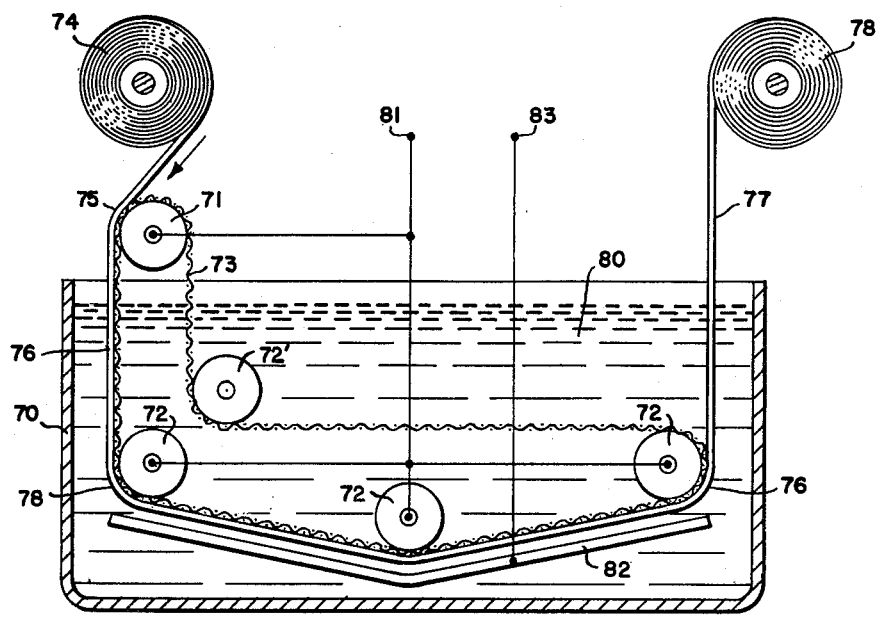
FIGURE 3 is a sectional diagram showing apparatus for the electrolytic treatment of slide fasteners.

The apparatus shown in FIGURE 3 includes a treatment tank 70 within which are mounted conductive rollers 72 and above which is mounted a conductive roller 71. A foraminous belt 73 passes over the roller 71 above the tank and over the rollers 72 and 72' within the tank. The belt 73 is preferably formed of knitted or woven metallic electrically conductive material which will not be adversely affected by the electrolyte solution 80 contained within the tank. A slide fastener tape passing from a supply roll 74 thereof comes into engagement with the belt 73 adjacent to the roller 71 as indicated at 75 and passes into and through the electrolyte solution 80 in engagement with the belt 73 as indicated at 76. The fastener tape then passes out of the bath as indicated at 77 and is wound upon a receiving roller 78. For the purpose of electro-chemical treatment, the rollers 71 and 72 are electrically connected to an electrical terminal 81 and a stationary electrode 82 extending adjacent to the fastener tape for a substantial portion of the length of its travel through the solution is connected to an electrical terminal 83. When aluminum fastener elements are being anodized, the rollers 71 and 72, the foraminous belt 73 and the stationary electrode 82 are preferably formed of a material such as, for example, titanium, which will not become coated with an electrically resistant coating and, thus, the electrical efficiency of these parts will not decrease during the period of use of the apparatus. When other electro-chemical treatments are employed, appropriate materials well known to the art may be substituted for titanium in order to provide the desired characteristics of these parts.

In operation of the apparatus, the roller 78 is driven and draws from the roller 74 either a single fastener tape or an assembled fastener comprising two tapes or a plurality of tapes in side by side relation. The fastener tape drawn from the roller 74 engages the foraminous belt 73 above the electrolyte solution 80. The terminals 81 and 83 are supplied with electric current either alternating or direct in accordance with the particular treatment involved. The foraminous belt passing over the roller 71 is reasonably dry, the porosity of the belt being such as to permit substantially complete drainage of the electrolyte solution therefrom as it rises out of the bath. The tape and the belt then pass downwardly and progress into and through the electrolyte bath during the passage of which reliable electrical contact is provided between the surface of the fastener elements lying in engagement with the foraminous belt. Due to this mechanical and electrical contact electrolytic treatment of the contact surfaces does not occur and thus constant electrical contact is provided during the entire passage of the elements through the bath. For those of the elements which do not engage portions of the foraminous belt and thus do not receive a flow of current directly from the belt, the conductor 62 connecting the elements as discussed in connection with the manufacture of the tape, by means of the apparatus shown in FIGURE 2, provides contact between the elements and thus all of the elements are maintained at an equal potential with respect to each other and at an equal potential difference with respect to the stationary electrode 82. Thus, substantially perfectly uniform electrolytic treatment of all of the fastener elements is obtained. It will be evident that the rear faces of the fastener elements are positioned in engagement with the foraminous belt and the irregularity of treatment of these faces resulting from contact thereof with the belt is not objectionable in the finished fastener.

It should be noted that if fastener tape mounting elements joined by a conductor were passed into a solution and engaged conductive rollers or tapes after their entry into the solution, there would result, due to the presence of the conductor, a partial treatment of all of the elements prior to their engagement with the conductive roller or tape. This partial treatment would then provide a partial insulating barrier between the elements and the roller or tape and thus interfere with the making of proper electrical contact between the elements and the current supplying roller or tape and inhibit proper and complete treatment of the elements giving rise to irregular and unsatisfactory electrolytic treatment. Thus, the combination of the conductor joining the fastener elements and the engagement of the elements on the tape with a current source prior to the entry of the tape into the electrolyte solution is essential to the proper electrolytic treatment of the fastener elements. It is noted that due to the fact that the conductor engaging the fastener elements and positioned under the fastener elements adjacent to the tape must be sufficiently small to prevent the addition of undue stiffness to the fastener assembly, the current carrying capacity of this conductor is not sufficient to provide all of the current flow required for electrolytic treatment by means of a single contact externally of the electrolytic bath, it is necessary, therefore, that additional contacts be provided within the bath.

Due to the fact that at this stage of operation the tape mounting the fastener elements is a waterproofed tape, as a result of the waterproofing operation described above in connection with FIGURE 1, the tape does not carry from the bath any of the treating solution, thus, there is affected both a preservation of the solution and a non-impregnation of the tape with the treatment solution. This non-impregnation not only conserves the treatment solution but also eliminates the need for extensive after-rinsing the tape, and eliminates the possibility of residual solution carried by the tape subsequently adversely affecting the tape or the elements thereon or contaminating subsequent baths.

As previously noted, treatment of fastener assemblies conventionally involves anodizing or plating depending upon whether the elements are formed of aluminum or of copper. These treatments are frequently followed by dyeing or staining treatments, respectively, and, in the case of aluminum fastener elements, the dyeing treatment is followed by a sealing treatment. The sealing treatment is employed in order to set the dye and keep it from washing out of the porous surface of the elements during subsequent use or treatment.

Anodizing and dyeing processes, which are carried out at room temperatures, are well known and need not be described in detail herein. However, sealing processes heretofore employed have involved the use of elevated temperatures of the order of 200° F. which would adversely affect removable tape waterproofing materials. I have found that sealing may be accomplished at temperatures of the order of 120° F. by use of a solution involving a hydrolysable salt of a weak metallic base such as nickel acetate to which there has been added small amounts of a soluble fluoride plus small amounts of a soluble dichromate. The composition limits of this solution are

|  | Minimum, g./l. | Maximum, g./l. |
|---|---|---|
| Hydrolysable Salt of a weak metallic base | 0.3 | saturation |
| Soluble Dichromate | 0.1 | 0.3 |
| Soluble Fluoride | 0.2 | 0.4 |

Time and temperature 100 to 120° F.–3 to 10 minutes.
Where g./l. is grams per liter.

The optimum quantity of the hydrolysable salt of a weak metallic base is approximately 5.0 g./l., a preferred range being 0.5 g./l. to 10 g./l. These solutions are applicable to sealing or insolubilizing a wide range of types of dye-stuffs without leaching out some of the dye during sealing.

A typical composition and method for sealing dyed anodized films on aluminum and its alloys is as follows:

5.0 grams of nickel acetate
0.4 gram of sodium fluoride
0.1 gram of sodium dichromate
0.5 gram of boric acid
1.0 liter of water
Time of treatment: about 3 to about 10 minutes
Temperature of bath: about 110° F. to 140° F.

The boric acid is used as a buffer to maintain a suitable pH value of the solution.

As previously noted, the electro-chemical treatment operation, such as anodizing or plating, may be carried out in apparatus such as is shown in applicant's FIGURE 3. Dyeing operations and other operations such as sealing operations may be carried out in apparatus such as is shown in applicant's FIGURE 1.

A typical example of a fastener manufactured in accordance with my invention involves a fastener having aluminum elements and of a size conventionally employed on garments which were treated in accordance with the following steps:

A fastener tape was passed through a solution consisting essentially of a saturated solution of Japan wax dissolved in carbon tetrachloride and subsequently dried in order to provide a wax impregnated tape.

Aluminum fastener elements were attached to the tape and a wire of aluminum alloy #56–SO of 0.008" diameter was positioned between the top of the bead of the tape and the aluminum fastener elements so that the fastener elements were clamped over the tape bead and each element made physical and electrical contact between the element and the surface of the aluminum conductor wire.

This assembly was then anodized by the making of electrical contact between the fastener elements and a conductive belt to introduce current to the elements, the current being conducted to elements not falling in conductive relation with the belt through aluminum wire positioned between the elements and the tape bead. The anodizing was done in an electrolyte of 18% by weight of sulphuric acid at 90° F. The current used was alternating current and the current density was 30 amperes per square foot of metal fastener area. The time of anodizing was 5 minutes.

After anodizing, the fastener elements were thoroughly water rinsed and dyed in an organic dye solution typical of those used in the art for dyeing anodized aluminum.

The dyed fastener assembly was then rinsed and treated in a sealing bath at 120° F. for 5 minutes, the bath consisting of:

5.0 g./l. of nickel acetate
0.1 g./l. of sodium dichromate
0.4 g./l. of sodium fluoride
0.5 g./l. of boric acid Where g./l. is grams per liter.

Following the sealing operation, the elements were rinsed and dried.

Removal of the wax from the tape was then accomplished by passing the tape through a bath, such as shown in FIGURE 1, containing carbon tetrachloride. The tape was then dried and the treatment was completed.

While wax and soluble oil removal may be accomplished by the use of solvents noted above, it will be evident that the removal of these materials may be accomplished by the use of heat resulting in either vaporization or run-off of the waterproofing material.

Figures 4, 5:
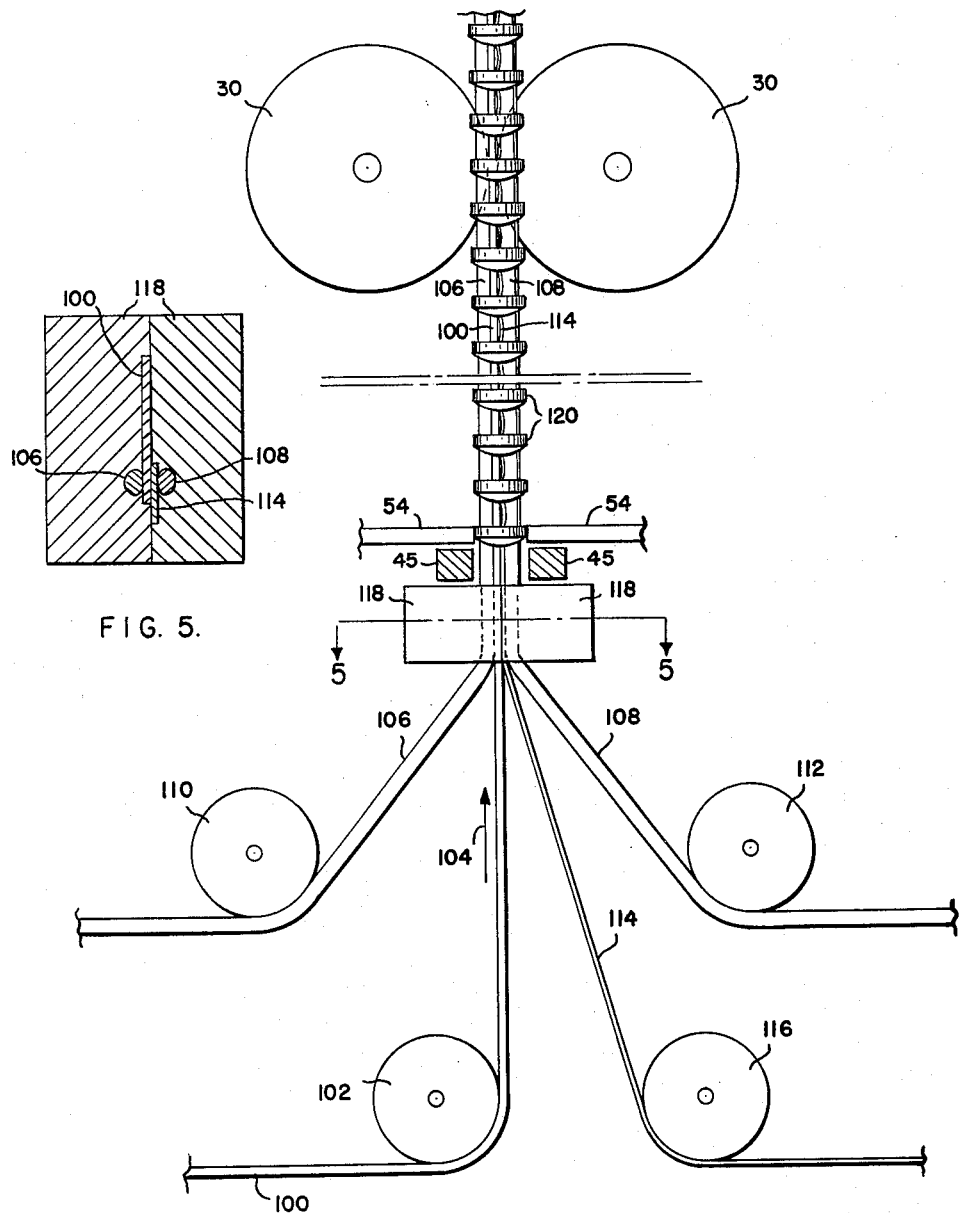
FIGURE 4 is a diagrammatical showing of apparatus for assembling a slide fastener tape with a conductor positioned to be engaged by elements subsequently assembled to the tape.
FIGURE 5 is a transverse section taken on the trace 5—5 shown in FIGURE 4.

In those instances when the fastener element treatment will require substantial current density and uniformity of treatment is essential, the maximum size conductor satisfactorily provided by the arrangement and described in connection with FIGURE 2 is of insufficient cross sectional area to carry the required electric current. In order to overcome the difficulties thus presented, I have devised an improved fastener assembly and apparatus for producing the assembly. This apparatus is shown in FIGURES 4 and 5.

In these figures, there is shown a tape 100 in the form of a flat web of material which may be constructed in any desired manner. The tape 100 is passed around a roller 102 and advances upwardly as indicated at 104 through apparatus for applying fastener elements thereto. As best shown in FIGURE 5, the tape 100 is a rectangular tape not provided with a bead.

Two cords 106 and 108 of bead forming material, which may be a woven or braided fibrous material or which may be otherwise formed, are passed over rollers 110 and 112, respectively, and pass upwardly with the tape 100. A ribbon 114 of conductive metal material passes around a roller 116 and upwardly with the tape and the beads. The tape 100, the two beads 106 and 108 and the ribbon 114 pass into a guide block which serves to align the two cords on opposite sides of one edge of the tape 100 with the ribbon 114 positioned between the core 108 and the tape 100 with a substantial portion of the ribbon extending beyond the edge of the tape. This arrangement is best shown in section in FIGURE 5.

As this arrangement of the tape, the beads and the ribbon passes upwardly out of the guide block 118, it passes between the legs 45 of a transfer slide assembly, such as that shown at 44 in FIGURE 2, serving to carry fastener elements into position against the tape, cord and ribbon assembly. The fasteners are squeezed into position by means of levers 54 such as those described in connection with FIGURE 2 and, thus, there is attached to the tape a sequence of fastener elements as indicated at 120. It will be evident that these fastener elements crumple or collapse the ribbon 114 in those regions in which they engage the ribbon and thus engage the ribbon over an extended area. At the same time, however, a major portion of the ribbon is lying on a plane substantially coincident with the plane of the tape 100 and thus the flexibility of the tape and of the final fastener assembly is not unduly diminished. It will be evident that the ribbon 114 provides a conductor of substantially greater cross-sectional area than is provided by the conductive wire 62 shown in FIGURE 2, this additional conductive area being provided without the addition of undue stiffness to the final fastener assembly.

It will also be evident that the composition of the ribbon will be selected depending upon the type of fastener element being treated. In the case of aluminum fastener elements, aluminum ribbon is desirably employed.

It is noted that in some applications of the invention it will be desirable to complete the dyeing or other desired treatment of the tape prior to the application of fastener elements thereon. Under these conditions, subsequent removal of the waterproofing from the tape is not necessary and non-removable waterproofing such as resins and insoluble soaps may be employed prior to the application of the fastener elements to the tape. Thus, after the elements are applied, they may be treated in various solutions without there being involved solution removal, solution contamination or tape contamination, the treatment of the fastener assembly being completed upon final treatment of the fastener elements.

In those applications wherein the color matching of the two halves of a fastener assembly is particularly critical and where the color matching of the tapes with the fastener elements is critical, this procedure provides the highly desirable expedient of making possible the dyeing of otherwise untreated tapes along with the attached elements and reliable results are assured by virtue of the complete absence of any residual quantities of the various solutions employed in the treatment of the fastener elements.

In FIGURE 6 there is shown a fragmentary length of a pair of assembled fastener tapes. The tapes 130 and 132 have secured thereto fastener elements 134 and 136, respectively. These elements are attached in spaced groupings, the spacings between the groupings being indicated at 138. The lengths of the groups of elements will vary depending upon the lengths of fastener assemblies being produced. Fastener assemblies are conventionally produced in various lengths ranging from approximately 6" to lengths of several feet and more. After a length of assembled tape such as shown in FIGURE 5 has been manufactured, the individual fastener lengths are severed therefrom by cutting the tapes through the areas indicated at 138.

If a conductor is positioned between the fastener elements and each tape then these conductors, if not attached to the tapes, will extend in the form of loose wires in the region between the end of a group of fastener elements and the adjacent ends of the tapes. This condition is shown in FIGURE 7 in which a pair of tapes 140 and 142 have fastener elements 144 and 146, respectively, attached thereto with conductive elements 148 and 150 extending between the tapes 140 and 142, respectively, and the fastener teeth thereon. It will be noted that at the end portions of the tapes in the regions thereof beyond the group of fastener teeth the conductive elements 148 and 150 extend as free unsupported wires. This condition is highly objectionable for the reason that these free or loose wires require special handling when the top and bottom stops are affixed to the fastener tape and when the fastener assembly is sewn into a garment or other object.

In order to avoid this objectionable condition, it is desirable to attach the conductors to the tapes between the groups of fastener elements and, while this may be done by local means such as stitching between the groups of fastener elements after the attachment of the groups of elements to the tape, a more complete securing is desirably employed in which a conductor is attached to each tape along the entire length thereof prior to the attachment of fastener teeth to the tape.

In FIGURE 8 there is shown a web 152 having beads 154 and 156 attached to opposite sides thereof, and between the bead 154 and the web 152 there is positioned a flat conductive foil ribbon 158. The two beads and the ribbon are connected to the web 152 by means of stitches 160 extending through the bead 156, the web 152, the foil 158 and the bead 154.

The conductive foil 158 is thin and easily deformed, thus, upon application of a fastener tooth the foil thereunder is crumpled or pressed down. This condition is shown in FIGURE 9 in which the web 152 has a fastener element 161 affixed thereto and in which the foil ribbon 158 is shown folded over under the tooth 161 as indicated at 163. This deformation of the conductive ribbon insures reliable contact between the ribbon and each of the fastener elements while, at the same time, as will be evident from FIGURE 8, the conductive ribbon is rigidly connected to the tape 152. Thus, when this type of tape is employed in an assembled fastener such as that shown in FIGURE 7 the conductive ribbon will not present objectionable free conductors such as the free ends 148 and 150 shown in FIGURE 7.

An alternative form of the invention is shown in FIGURE 10 in which a tape 162 is formed with an integral bead 165 on top of which a conductive ribbon 164 is attached by means of stitches 166.

FIGURE 11 shows a transverse section through a tape 162 having a ribbon 164 attached thereto and a fastener element 168 positioned thereover. It will be evident that the fastener element serves to deform the ribbon 164 clamping the edges of the ribbon 170 around the tape bead. This deformation of the ribbon insures reliable contact between the ribbon and each of the fastener elements.

A further modification of the invention is shown in FIGURE 12 in which a tape 172 is formed with a bead 174 having a conductive ribbon 176 attached to the side thereof by means of stitches 178. As shown in FIGURE 13, when a fastener element 180 is affixed to the bead 174 the ribbon 176 is deformed as shown at 182 as a result of the application of the fastener element to the tape bead. In this form of the invention, as in the forms shown in FIGURES 9 and 11, the deformation of the conductive member by the fastener element serves to insure contact between the conductive member and the fastener element.

In each of the arrangements shown in FIGURES 8-13 the foil conductive ribbon is sufficiently thin, for example, .002" thick, that flexing of the tape is not appreciably inhibited by the ribbon. When flexing occurs in assembled fasteners of the type shown in FIGURES 10 and 11, the foil crumples and is not cracked, however, this is of no consequence for the reason that the foil ribbon is employed only in electrolytic operations which are completed before the fastener is placed in service and the relatively small amount of flexing which occurs as a result of handling during electrolytic treatment is insufficient to materially damage the conductor.

In FIGURE 14 there is shown a tape 184 provided with a bead 186 and having a conductive element 188 in the form of a wire positioned against the longitudinal edge of the bead. The wire 188 is affixed to the bead by means of stitches 190 of thread secured in the bead and passing over the wire. These stitches are preferably formed from a relatively light soft thread which will have sufficient strength to hold the wire in engagement with the bead during assembly of the fastener during treatment of the assembly, and during installation of the fastener assembly into an article. The stitch threads are, however, sufficiently soft and light to permit cutting of the threads by the fastener elements when the elements are attached to the tape.

In FIGURE 15 there is shown a tape 192 formed with a bead 194 and having a conductive element 196 positioned thereon. In this form of the invention the conductive element 196 is positioned under a thin light gauze or mesh 198 which is in turn stitched to the tape bead by means of stitches 200. This arrangement permits the use of extremely light threads in the gauze serving to position the conductor while at the same time permitting relatively heavy threads to secure the gauze and capable of being stitched to the tape bead. Thus, the gauze threads which are easily cut by applied fastener elements are the only threads falling in a position between any of the elements and the conductive member.

In FIGURE 16 there is shown a fragmentary longitudinal length of assembled tape 184 showing conductors 188 and fastener elements 202 positioned thereon. It will be seen that the attachment of these elements is accomplished with sufficient force to provide a substantial deformation of the conductors 188 and that this force and the resulting deformation serve to cut or sever any threads existing between the fastener elements and the conductors. Thus, again, reliable contact between the individual elements and the conductive members is insured. A similar cutting of the threads of the gauze 198 in FIGURE 15 will occur upon assembly of fastener elements on the tape 192.

From the foregoing it will be evident that the various forms of the invention described in connection with FIGURES 8-16 each provide a fastener assembly in which the conductive member is secured to the tape and thus free ends of the conductive members, such as those shown at 148 and 150 in FIGURE 7, are avoided. At the same time, however, each of the structures provides for reliable contact between the fastener elements and a conductive member extending longitudinally of the tape between the elements and the tape. Furthermore, in each instance the conductive member is deformed by the fastener elements mounted thereover thus insuring both electrical contact between each of the fastener elements and the conductive member and insuring the severing of any threads or stitches which may fall between the conductive member and any of the fastener elements.

This cutting of the threads may be further facilitated by the use of fastener elements of the type disclosed in my copending application Serial No. 687,046 filed September 30, 1957, now Patent No. 2,963,760, described therein as having a sharp edge on the surface thereof facing the tape bead capable of cutting or penetrating foreign matter such as threads occurring between the fastener elements and a conductive member adjacent to the tape bead.

What is claimed is:

1. A slide fastener assembly comprising a tape having a bead along one longitudinally extending edge thereof, fastener elements mounted in spaced relation along said bead with each endmost fastener element set back a substantial distance from the associated end of said bead, a conductive member extending the full length of said bead and in the form of a flexible ribbon made of metallic sheet material having at least one longitudinally extending marginal portion extending parallel and in overlying relation to said bead and in underlying relation to and in conductive contact with said fastener elements, and a line of stitches extending through and securing said conductive member to said bead independently of said fastener elements and throughout the full length of said bead.

2. A slide fastener as defined in claim 1 wherein the bead comprises a longitudinally extending marginal portion of the tape and a pair of longitudinally extending members disposed respectively upon opposite sides of said marginal tape portion, and the conductive member is disposed with one longitudinally extending marginal portion sandwiched between said marginal tape portion and one of said bead forming members and with the other one of its longitudinally extending marginal portions folded over the narrow edge of said marginal tape portion.

3. A slide fastener as defined in claim 1 wherein the conductive member is of a width to extend substantially half way about the bead.

4. A slide fastener as defined in claim 1 wherein the conductive member is of a width to extend substantially half way about the bead, substantially all of the conductive member being disposed upon one side of the bead.

References Cited in the file of this patent

UNITED STATES PATENTS

| | | |
|---|---|---|
| 2,264,324 | Morin | Dec. 2, 1941 |
| 2,264,326 | Morin | Dec. 2, 1941 |
| 2,264,580 | Morin | Dec. 2, 1941 |
| 2,334,054 | Wooters | Nov. 9, 1953 |
| 2,573,046 | Natzler | Oct. 30, 1951 |
| 2,739,931 | Bernstiel | Mar. 27, 1956 |

FOREIGN PATENTS

| | | |
|---|---|---|
| 49,872 | Netherlands | Jan. 17, 1941 |
| 79,393 | Denmark | June 13, 1955 |